(12) United States Patent
Maestas et al.

(10) Patent No.: US 8,077,708 B2
(45) Date of Patent: Dec. 13, 2011

(54) SYSTEMS AND METHODS FOR DETERMINING A FLOW OF DATA

(75) Inventors: David Edward Maestas, Lake Saint Louis, MO (US); Brian Louis Cooper, St. Louis, MO (US)

(73) Assignee: Techguard Security, LLC, O'Fallon, MO (US)

( * ) Notice: Subject to any disclaimer, the term of this patent is extended or adjusted under 35 U.S.C. 154(b) by 1015 days.

(21) Appl. No.: 11/591,802

(22) Filed: Nov. 1, 2006

(65) Prior Publication Data

US 2008/0069093 A1  Mar. 20, 2008

Related U.S. Application Data

(60) Provisional application No. 60/773,820, filed on Feb. 16, 2006.

(51) Int. Cl.
*H04L 12/28* (2006.01)
*H04L 12/56* (2006.01)

(52) U.S. Cl. ....................................................... 370/389

(58) Field of Classification Search ........................ None
See application file for complete search history.

(56) References Cited

U.S. PATENT DOCUMENTS

| | | |
|---|---|---|
| 4,569,026 A | 2/1986 | Best |
| 5,261,041 A | 11/1993 | Susman |
| 5,414,833 A | 5/1995 | Hershey et al. |
| 5,440,723 A | 8/1995 | Arnold et al. |
| 5,682,469 A | 10/1997 | Linnett et al. |
| 5,769,074 A | 6/1998 | Barnhill et al. |
| 5,956,038 A | 9/1999 | Rekimoto |
| 5,983,348 A | 11/1999 | Ji |
| 5,991,881 A | 11/1999 | Conklin et al. |
| 5,999,932 A | 12/1999 | Paul |
| 6,052,788 A | 4/2000 | Wesinger, Jr. et al. |
| 6,108,800 A | 8/2000 | Asawa |
| 6,119,236 A | 9/2000 | Shipley |
| 6,154,844 A | 11/2000 | Touboul et al. |
| 6,192,477 B1 | 2/2001 | Corthell |
| 6,219,786 B1 | 4/2001 | Cunningham et al. |

(Continued)

FOREIGN PATENT DOCUMENTS

WO    2007/098362    8/2007

OTHER PUBLICATIONS

Written Opinion and International Search Report for PCT/US2007/62313, dated Feb. 5, 2008, 11 pages.

(Continued)

*Primary Examiner* — Chirag Shah
*Assistant Examiner* — Minh-Trang Nguyen
(74) *Attorney, Agent, or Firm* — Gallop, Johnson & Neuman, L.C.

(57) ABSTRACT

A method for determining a flow of data is described. The method includes determining whether a packet including a first number of at least one bit within a first set is assigned a classification value based on the at least one bit within the first set and determining a result to be applied to the packet upon determining that the packet is assigned the classification value. The method further includes analyzing, by a processor, at least one bit of a second number within a second set of the packet upon determining that the packet cannot be assigned the classification value based on the first number of at least one bit of the packet.

12 Claims, 5 Drawing Sheets

U.S. PATENT DOCUMENTS

| | | | |
|---|---|---|---|
| 6,304,975 | B1 | 10/2001 | Shipley |
| 6,321,338 | B1 | 11/2001 | Porras et al. |
| 6,357,008 | B1 | 3/2002 | Nachenberg |
| 6,363,489 | B1 | 3/2002 | Comay et al. |
| 6,377,577 | B1 | 4/2002 | Bechtolsheim et al. |
| 6,519,703 | B1 | 2/2003 | Joyce |
| 6,711,615 | B2 | 3/2004 | Porras et al. |
| 6,754,662 | B1 | 6/2004 | Li |
| 6,985,168 | B2 | 1/2006 | Swift et al. |
| 7,512,781 | B2 * | 3/2009 | Culbert ................... 713/153 |
| 7,676,841 | B2 | 3/2010 | Zaheer et al. |
| 2004/0128355 | A1 * | 7/2004 | Chao et al. ............... 709/206 |
| 2007/0101195 | A1 * | 5/2007 | Gooch et al. ............... 714/34 |
| 2007/0271613 | A1 | 11/2007 | Joyce |

OTHER PUBLICATIONS

"Algorithms for Packet Classification," Pankaj Gupta and Nick McKeown; Mar. 1, 2001; pp. 24-32.

"Packet Filtering," D. B. Chapman et al.; Jan. 1, 1995; pp. 131-188.

"PF: Packet Tagging (Policy Filtering)," Anonymous Internet Article; Dec. 28, 2005; pp. 1-4.

"How to Block a Country From Accessing Entire Server," Webhosting Talk Forum Members; Jul. 24, 2005; pp. 1-8.

David Weimer, S.K. Ganapathy, A Synthetic Visual Environment With Hand Gesturing and Voice Input, CHI '89, AT&T Bell Laboratories, Crawfords Corner Rd., Holmdel, NJ 07733, Proceedings, May 1989, pp. 235-240.

N. Durlach and A.S. Mavor, Virtual Reality: Scientific and Technological Challenges, National Academy Press, 1995, Washington, D.C., pp. 1-542.

Office Action From Pending U.S. Appl. No. 11/464,772, dated Oct. 5, 2009.

Office Action From Pending U.S. Appl. No. 11/464,772, dated Jun. 23, 2010.

* cited by examiner

SYSTEMS AND METHODS FOR DETERMINING A FLOW OF DATA

CROSS REFERENCE TO RELATED APPLICATIONS

This application claims priority to U.S. Provisional Patent Application with Ser. No. 60/773,820 filed on Feb. 16, 2006 and hereby incorporated by referenced in its entirety.

STATEMENT REGARDING FEDERALLY SPONSORED RESEARCH AND DEVELOPMENT

This invention was made with United States Government Support under Cooperative Agreement Number 70NANB3H3055 awarded by the National Institute of Standards and Technology (NIST). The United States Government has certain rights in the invention.

BACKGROUND OF THE INVENTION

This invention relates generally to computer networks and more particularly to systems and methods for determining a flow of data.

Conventional rule-based computer security firewalls are based upon varyingly complex sets of rules, or "rule bases". Data packets that enter such a firewall are compared to information in, and rules of, one or more rule bases to determine whether the data packets should be allowed to pass through the firewall. Rule bases are structured around concepts of logical comparisons, such as Boolean logic, and sequential rule flow through a list of rules. As rule bases become more complex, they require more system and processor overhead. Consequently, organizations that use firewalls often compromise between rule base complexity and perceived required data throughput, sacrificing some amount of security in favor of performance.

BRIEF DESCRIPTION OF THE INVENTION

In one aspect, a method for determining a flow of data is described. The method includes determining whether a packet including a first number of at least one bit within a first set is assigned a classification value based on the at least one bit within the first set and determining a result to be applied to the packet upon determining that the packet is assigned the classification value. The method further includes analyzing, by a processor, at least one bit of a second number within a second set of the packet upon determining that the packet cannot be assigned the classification value based on the first number of at least one bit of the packet.

In another aspect, a processor is described. The processor is configured to determine whether a packet including a first number of at least one bit within a first set is assigned a classification value based on the at least one bit within the first set and determine a result to be applied to the packet upon determining that the packet is assigned the classification value. The processor is further configured to analyze at least one bit of a second number within a second set of the packet upon determining that the packet cannot be assigned the classification value based on the first number of at least one bit of the packet.

In yet another aspect, a computer-readable medium is described. The computer-readable medium is encoded within a computer program configured to determine whether a packet including a first number of at least one bit within a first set is assigned a classification value based on the at least one bit within the first set, determine a result to be applied to the packet upon determining that the packet is assigned the classification value, and analyze at least one bit of a second number within a second set of the packet upon determining that the packet cannot be assigned the classification value based on the first number of at least one bit of the packet.

In still one aspect, a method for determining a flow of data is described. The method includes generating a graphical user interface including a map, receiving a selection of a point on the map, displaying a plurality of results upon receiving the selection of the point, receiving a selection of one of the results, and assigning the one of the results to the point.

DETAILED DESCRIPTION OF THE INVENTION

Figure 1:
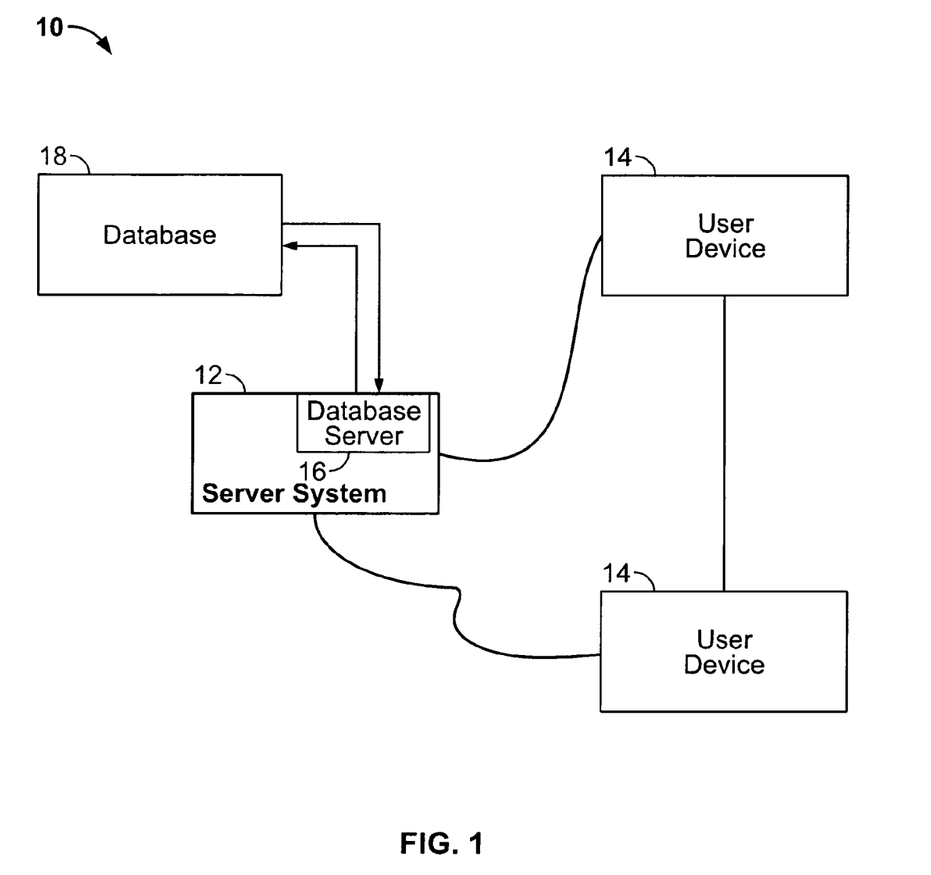
FIG. 1 is a block diagram of an embodiment of a system for determining a flow of data.

FIG. 1 is a block diagram of an embodiment of a system 10 for determining a flow of data. System 10 includes a server system 12 and a plurality of user devices 14 connected to server system 12. As used herein, the term server is not limited to just those integrated circuits referred to in the art as a computer, but broadly refers to a processor, a microcontroller, a microcomputer, a programmable logic controller, an application specific integrated circuit, any other programmable circuit, and any combination of hardware and software, and these terms are used interchangeably herein. In one embodiment, user devices 14 are computers including a web browser, and server system 12 is accessible to user devices 14 via a network, such as, a local area network (LAN) and a wide area network (WAN). The LAN may include an Intranet and the WAN may include the Internet.

User devices 14 are interconnected to the network through many interfaces including dial-in-connections, cable modems, and high-speed integrated services digital network (ISDN) lines. Alternatively, user devices 14 include a web-based phone or other web-based connectable equipment, which are capable of interconnecting to the network. Server system 12 includes a database server 16 connected to a centralized database 18 that includes a method for determining a flow of data.

In one embodiment, centralized database 18 is stored on database server 16 and can be accessed by potential users at one of user devices 14 by logging onto server system 12 through one of user devices 14. In one embodiment, centralized database 18 is stored remotely from server system 12.

Figure 2:
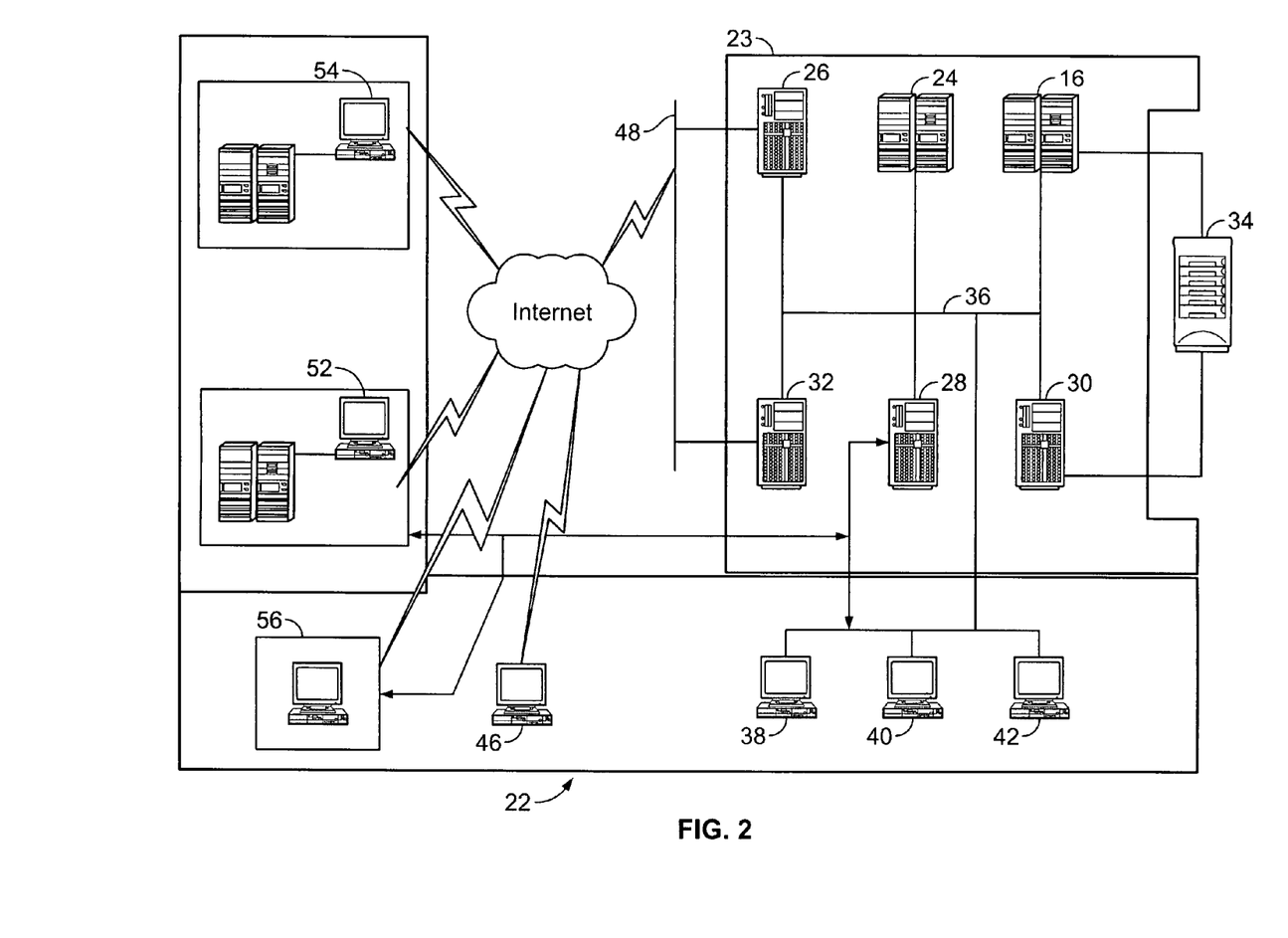
FIG. 2 is a detailed block diagram of an embodiment of a system for determining a flow of data.

FIG. 2 is a detailed block diagram of an embodiment of a system 22 for determining a flow of data. System 22 includes a server system 23. Server system 23 is an example of server system 12. Server system 23 includes database server 16, an application server 24, a web server 26, a fax server 28, a directory server 30, and a mail server 32. A disk storage unit 34, which is a single database, is coupled to database server 16 and directory server 30.

Servers 16, 24, 26, 28, 30, and 32 are coupled in a local area network (LAN) 36. Alternatively, a WAN could be used in place of LAN 36. In addition, a system administrator work station 38, a user work station 40, and a supervisor work station 42 are coupled to LAN 36. Each work station 38, 40, and 42 is a personal computer having a web browser.

Server system 23 is communicatively coupled to various workstations 52 and 54, which are operated by individuals or employees. A person or user operating work station 52 can access server system 23. Work stations 52 and 54 are personal computers having a web browser. Work station 54 is located at a remote location. Server system 23 is also communicatively coupled to a workstation 46 via an Internet service provider (ISP) connection 48.

Furthermore, fax server 28 communicates with workstation 52 and any remotely located user system, including a workstation 56 via a telephone link. Each workstation 38, 40, 42, 46, 52, 54, and 56 is an example of user device 14. Fax server 28 communicates with other work stations 38, 40, and 42 as well. Server system 23 executes methods, described herein, for determining a flow of data.

The communication in the exemplary embodiment is illustrated as being performed via the Internet, however, any other wide area network (WAN) type communication can be utilized in other embodiments. Systems and methods for determining a flow of data are not limited to being practiced via Internet. In one embodiment, methods for determining a flow of data are stored in disk storage unit 34, which is an example of a computer-readable medium, and are executed by any of servers 16, 24, 26, 28, 30, and 32. Other examples of a computer readable medium include a floppy disk, a compact disc-read only memory (CD-ROM), and a digital video disk (DVD).

Figure 3:
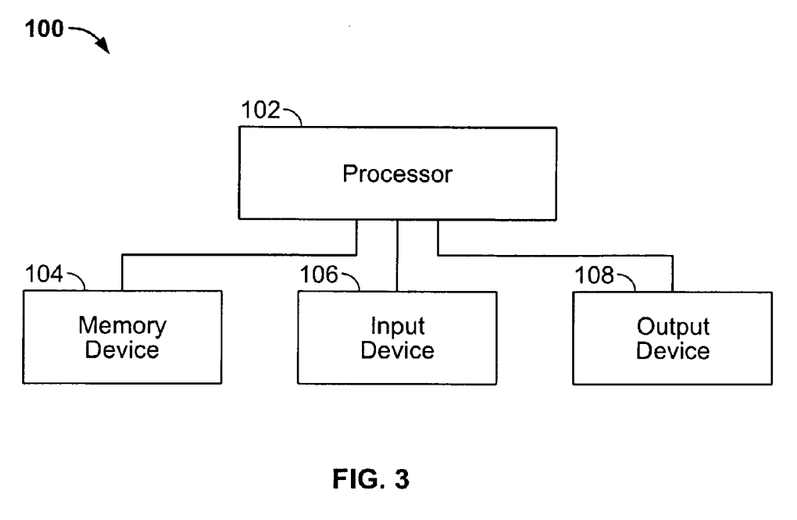
FIG. 3 is a block diagram of another embodiment of a system for determining a flow of data.

FIG. 3 is a block diagram of an embodiment of a system 100 for determining a flow of data. System 100 includes a processor 102, a memory device 104, an input device 106, and an output device 108. Processor 102 may be either an x86 architecture operating a Linux™ operating system or an x86_64 architecture operating the Linux™ operating system. The x86 architecture is available from Intel™ corporation and the x86_64 architecture is available from Advanced Micro Devices™ (AMD) corporation. Examples of memory device 104 include a random access memory (RAM) and a read-only memory (ROM). Examples of input device 106 include a mouse and a keyboard. Examples of output device 108 include a cathode ray tube (CRT) and a liquid crystal display (LCD). As used herein, the term processor is not limited to just those integrated circuits referred to in the art as a processor, but broadly refers to a computer, a microcontroller, a microcomputer, a programmable logic controller, an application specific integrated circuit, and any other programmable circuit.

Processor 102 executes the methods for determining a flow of data. In one embodiment, processor 102 is a firewall that prevents communication of packets of data between two networks, such as Internet and an Intranet, based on a security policy.

Figure 4:
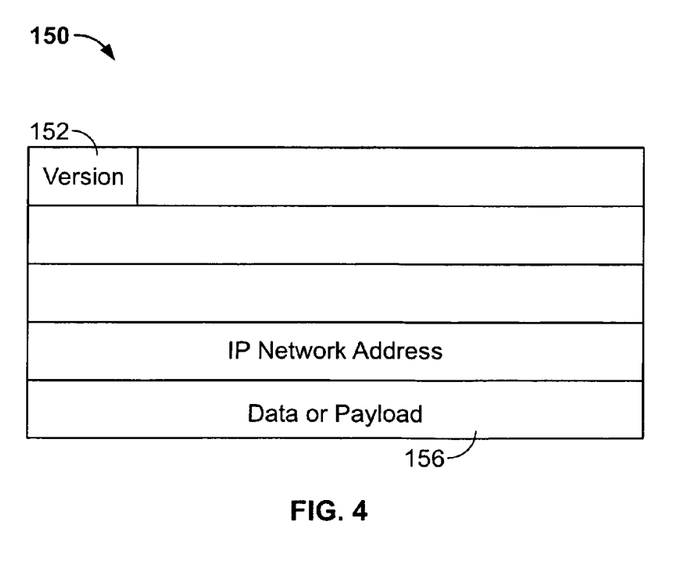
FIG. 4 is a diagram of an embodiment of a packet of data received by a processor of the system of FIG. 3.

FIG. 4 is a diagram of an embodiment of a packet 150 of data received by processor 102. Packet 150 includes a version 152, an Internet protocol (IP) network address, and data 156. Examples of version 152 include an IPv4 version and an IPv6 version of IP network addresses. Examples of the IP network address of packet 150 include either a source address or a destination address. The source address is an address of a source of sender, such as workstation 52, of packet 150. The destination address includes an address of a receiver or a destination, such as workstation 38 or 40, of packet 150. In one embodiment, packet 150 also includes a header length of a header of packet 150, a type of service to be provided to packet 150, a total length of packet 150, a header checksum that is used by processor 102 to determine whether all bits of the header are valid, a time to live of packet 150, a plurality of flags used to determine whether to fragment packet 150, and a fragment offset used by processor 102 to determine whether packet 150 is a portion of an IP datagram. In the embodiment, if IP network address of packet 150 is the source address, packet 150 further includes the destination address and if IP network address of packet 150 is the destination address, packet 150 includes the source address.

Figure 5:
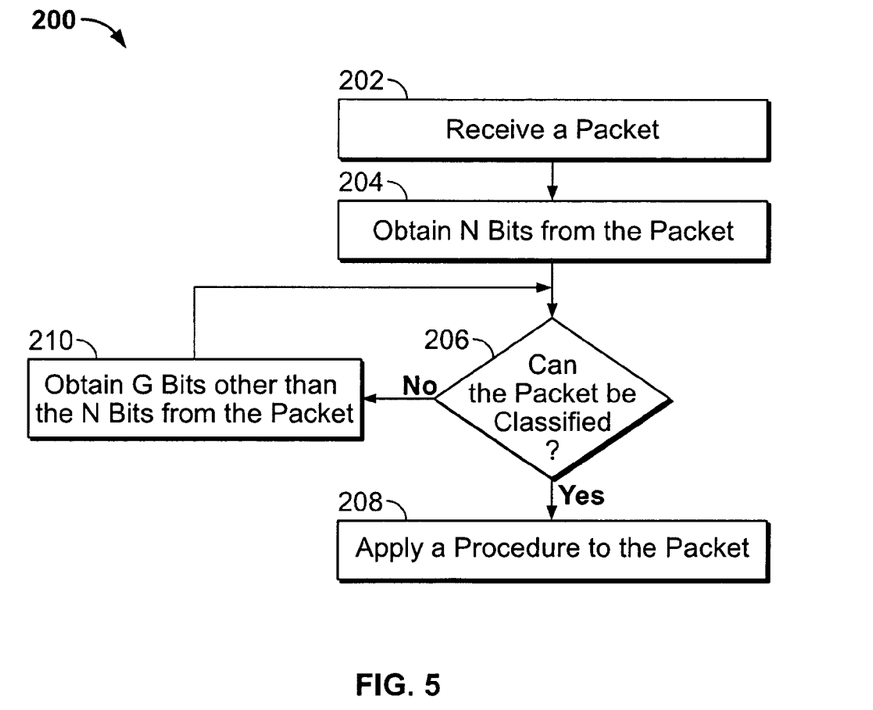
FIG. 5 is a flowchart of an embodiment of a method for determining a flow of data.

FIG. 5 is a flowchart of an embodiment of a method 200 for determining a flow of data. Processor 102 receives 202 packet 150 and obtains 204 or extracts N bits from packet 150. Example of N includes 3, 4, 6, 8, or 10. Another example of N bits includes less than 32 bits of the IP network address of packet 150. Yet other example of N includes less than 128 bits of the IP network address of packet 150. Still other example of N bits includes 2 bits of other than 3 most significant bits (MSBs) and 3 least significant bits (LSBs) of 8 MSBs of the IP network address of packet 150. Other example of N includes 2 LSBs of 8 MSBs of the IP network address of packet 150. Processor 102 determines that the IP network address of packet 150 is located after a bit α and before a bit β of packet 150 based on version 152 of packet 150, and extracts N bits between the bit α and the bit β from the IP network address of packet 150. As another example, processor 102 determines that data 156 is located after a bit γ and before a bit η of packet 150 based on version 152 of packet 150 and extracts N bits from the data 156 between the γ and η bits. As yet another example, processor 102 determines that a port address is located after a bit σ and before a bit ω of packet 150 based on based on version 152 of packet 150 and extracts N bits between the σ and ω bits from port address. An example of the port address includes a source port address, such as a transmission control protocol (TCP) or a user datagram protocol (UDP) port number, of a source computer application executed by the source and a destination port address, such as a TCP or a UDP port number, of a destination computer application executed by the destination. As another example, processor 102 extracted some of N bits from the IP network address of packet 150 and the remaining of the N bits from the port address.

Processor 102 determines 206 whether packet 150 can be classified based on N bits of packet 150. Processor 102 determines 206 whether packet 150 can be classified by comparing N bits with a table I provided, via input device 106, by the user to memory device 104.

TABLE I

| Row Number | Sub-ranges | Classification Values | Results |
|---|---|---|---|
| 1 | R1-R2 | C1 | S1 |
| 2 | R3-R4 | C2 | S2 |
| 3 | R5-R6 | | |
| 4 | R7-R8 | | |
| 5 | R9-R10 | | |
| 6 | R11-R12 | | |

The sub-ranges R1-R2, R3-R4, R5-R6, R7-R8, R9-R10, and R11-R12 within table I form a finite set, such as a set of M bits of port addresses, a set on M bits of authorization data, such as user names and passwords, a set of M bits of IP network addresses, and a set of M bits of a combination of IP network addresses and port addresses. Examples of the classification values C1 and C2 include a set of country codes identifying a plurality of countries, a set of sub-region codes identifying a plurality of sub-regions, a set of hacker codes identifying a plurality of computer hackers, a set of spammer codes identifying a plurality of computer spammers, a set of virus codes identifying a plurality of computer viruses, a set of Trojan codes identifying a plurality of Trojans, a set of worm codes identifying a plurality of computer worms, a plurality of phishing codes identifying a plurality of phishers, a set of intruder codes identifying a plurality of intruders that gain access to a computer network connected to processor 102 via a backdoor, a set of North Atlantic treaty organization (NATO) country codes identifying a plurality of NATO countries, a set of corporation codes identifying a plurality of corporations, a set of government agency codes identifying a plurality of government agencies, a set of Internet service provider (ISP) codes identifying a plurality of ISPs, a set of industrial sector codes identifying a plurality of industrial sectors, and a set of Department of Defense (DoD) codes identifying a plurality of DoDs. For example, C1 is a country code for Canada and C2 is a country code for United States of America (U.S.A.). Examples of the industry sectors include an oil industry, an airplane industry, a computer software industry, and a gaming and entertainment industry.

Examples of the results or procedures S1 and S2 include an acceptance or denial of packet 150 by processor 102. Other example of the results S1 and S2 include assigning a priority or not assigning a priority to packet 150. Yet other examples of the results include assigning a Quality of Service (QoS) to packet 150. Example of QoS includes that packet 150 is not dropped in reaching the destination. Other example of QoS includes that packet 150 is not delayed in reaching the destination. The acceptance of packet 150 by processor 102 includes allowance of packet 150 to pass through the firewall from one computer network to another computer network to reach the destination. An example of the denial of packet 150 by processor 102 includes sending, by processor 102, packet 150 for applying one of the procedures to a honeypot that masquerades as system 100 to trap either an attacker, such as a spammer of a hacker, to determine a characteristic of the attacker and represent the characteristic of the attacker to a Law Enforcement Agency. An example of the denial of packet 150 includes deleting packet 150 to prevent packet 150 from further proceeding through a network. Yet another example of the denial of packet 150 by processor 102 includes not allowing packet 150 to pass through the firewall to reach the destination. As still another example, the denial of packet 150 by processor 102 includes shunting, by processor 102, packet 150 to another processor 102 for performing at least one of a "Whois" query, an American Registry of International Numbers (ARIN) lookup of packet 150, and tracing a route of packet 150 within a computer network to determine the attacker that sent packet 150. Upon determining the attacker, processor 102 reports the attacker to the Law Enforcement Agency.

Processor 102 compares N bits of packet 150 with M Bits of each of sub-ranges R1-R2, R3-R4, R5-R6, R7-R8, R9-R10, and R11-R12 of table determine whether one of the sub-ranges have the M bits that match the N bits. It is noted that M is equal to N. Upon determining that one of the sub-ranges, such as R1-R2, has M bits that match N bits, processor 102 assigns one of the corresponding classification values, such as C1, to packet 150. As an example, upon determining that N bits match M bits of the sub-range R3-R4, processor 102 assigns the classification value C2 to packet 150. If processor 102 determines that one of the classification values within table I exist corresponding to one of the sub-ranges R1-R2, R3-R4, R5-R6, R7-R8, R9-R10, and R11-R12, of table I, having M bits that match the N bits, processor 102 determines that packet 150 is classified. On the other hand, if processor 102 determines that one of the classification values, within table I, corresponding to one of the sub-ranges R1-R2, R3-R4, R5-R6, R7-R8, R9-R10, and R11-R12, of table I, having M bits that match the N bits does not exist, processor 102 determines that packet 150 cannot be classified. For example, upon comparing M and N bits, processor 102 determines that the N bits of packet 150 match the M bits within the sub-range R5-R6 that does not correspond to one of the classification values C1 and C2. In the example, upon determining, by processor 102, that the N bits do not correspond to one of the classification values C1 and C2, processor 102 determines that packet 150 cannot be classified.

Upon determining that packet 150 is classified, processor 102 either provides 208 a procedure or one of the results S1 and S2 corresponding to one of the classification values or sends packet 150 to another processor 102, such as one included within workstation 52, that applies the one of the results to packet 150. As an example, upon determining that packet 150 is classified under the classification value C1, processor 102 applies the result S1 to packet 150. As another example, upon determining by processor 102 that packet 150 has the classification value C2, processor 102 sends packet 150 to another processor, such as one included within workstation 54, that applies the result S2 to packet 150. Upon determining that packet 150 is classified, processor 102 does not examine bits of packet 150 other than N bits to determine whether packet 150 can be classified.

A table II, provided below, is an example of table I.

TABLE II

| ROW NUMBER | IP NETWORK ADDRESS SUB-RANGES | COUNTRY CODES | COUNTRIES | RESULTS |
|---|---|---|---|---|
| 1 | 0 | 148 | Reserved | Accept |
| 2 | 1-2 | 199 | Unassigned | Deny |
| 3 | 3-4 | 189 | United States | Accept |
| 4 | 5-9 | 199 | Unassigned | Deny |
| 5 | 10-22 | 148/189 | Reserved, United States | Accept |
| 6 | 23 | 199 | Unassigned | Deny |
| 7 | 24 | | | |
| 8 | 25 | 188 | United Kingdom | Accept |
| 9 | ... | ... | ... | ... |
| 10 | 43 | 88 | Japan | Accept |
| 11 | ... | ... | ... | ... |
| 12 | 47 | 36 | Canada | Accept |
| 13 | ... | ... | ... | ... |
| 14 | 53 | 66 | Germany | Deny |
| 15 | 54-56 | 189 | United States | Accept |
| 16 | 57 | 61 | France | Deny |
| 17 | ... | ... | ... | ... |
| 18 | 80-88 | | | |
| 19 | 89-124 | 199 | Unassigned | Deny |
| 20 | ... | ... | ... | ... |
| 21 | 216-223 | | | |
| 22 | 224-255 | 148 | Reserved | Accept |

IP network address sub-ranges of table II are an example of the sub-ranges of table I, country codes of table II are an example of classification values of table I, and results of table II are an example of the results of table I. For example, each IP network address sub-range, such as 54 or 57, are MSBs of an IP network address within the finite set.

Processor 102 compares N bits of packet 150 with each of the IP network address sub-ranges of table II and determines one of the IP network address sub-ranges having M bits that match the N bits. For example, upon determining by processor 102 that M bits of IP network address sub-range 47 of a plurality of IP network addresses 47.0.0.0-47.255.255.255 of table II matches N bits of packet 150, processor 102 assigns a country code 36 of table II to packet 150 and determines that packet 150 is sent from Canada. Upon determining that packet 150 is sent from Canada, processor 102 determines to accept packet 150 based on table II. As another example, upon determining by processor 102 that M bits of IP network address sub-ranges 23 of table II matches N bits of packet 150, processor 102 assigns a country code 199 of table II to packet 150 and determines that packet 150 is sent from an unassigned region. Upon determining that packet 150 is sent from the unassigned region, processor 102 determines to deny packet 150 as shown in table II. As yet another example, upon determining by processor 102 that M bits of IP network address sub-range 227 of a plurality of IP network addresses 224.0.0.0-255.255.255.255 of table II matches N bits of packet 150, processor 102 assigns a country code 148 of table II to packet 150 and determines that packet 150 is sent from a reserved region. Upon determining that packet 150 is sent from the reserved region, processor 102 determines to accept packet 150 based on table II. As still another example, upon determining by processor 102 that M bits of IP network address sub-range 216-223 matches N bits of packet 150, processor 102 determines that packet 150 cannot be classified based on a classification value.

A table III, provided below, is another example of table I.

TABLE III

| IP NETWORK ADDRESS SUB-RANGES | RESULTS |
|---|---|
| 0-127 | Allow |
| 128-160 | Deny |
| 161-163 | Allow |
| 164-167 | Deny |
| 168-191 | Allow |
| 192-207 | Deny |
| 208-255 | Allow |

IP network address sub-ranges of table III are 8 MSBs, which are an example of M bits, of IP network address sub-ranges, within the finite set, of table I. Moreover, results of table III are an example of results of table I.

Processor 102 receives N bits of packet 150, compares the N bits with M bits of each IP network address sub-ranges of table III to determine one of the IP network address sub-ranges having M bits that match the N bits. Upon determining that N bits of packet 150 match with M bits within any of the IP network address sub-ranges 0-127, 161-163, 168-191, and 208-255, processor 102 determines that packet 150 is allowed to pass through the firewall. On the other hand, upon determining that N bits of packet 150 match M bits within any of IP network address sub-ranges 128-160, 164-167, and 192-207, processor 102 determines to deny passage of packet 150 through the firewall.

A table IV, shown below, is yet another example of table I.

TABLE IV

| IP NETWORK ADDRESS SUB-RANGES | MSBs of IP NETWORK ADDRESS SUB-RANGES | RESULTS |
|---|---|---|
| 0-127 | 0 | Allow |
| 128-255 | 1 | |

IP network address sub-ranges of table IV are an example of sub-ranges of table I and results of table IV are an example of results of table I.

Processor 102 compares an MSB, which is an example of N, of the IP network address of packet 150 with an MSB, which is an example of M, of each of IP network address sub-ranges of table IV to determine whether the MSB of packet 150 matches either bit 1 or bit 0. Upon determining that MSB of the IP network address of packet 150 matches bit 0, which is an MSB of IP network address sub-range 0-127 of table IV, processor 102 determines, based on the results of table IV, to allow passage of packet 150 via the firewall. On the other hand, upon determining that MSB of the IP network address of packet 150 matches bit 1, which is an MSB of IP network address sub-range 128-255 of table IV, processor 102 determines, based on the results of table IV, that packet 150 cannot be classified and does not provide a result to packet 150.

Upon determining that packet 150 cannot be classified based on N bits of packet 150, processor 102 obtains 210 G bits other than the N bits from packet 150. Upon determining that packet 150 cannot be classified by comparing N bits with M bits of sub-ranges of table I, processor 102 obtains G bits from packet 150. As an example, processor 102 determines that packet 150 is an IPv4 packet 150 and extracts 7 bits sequentially following MSB of the IP network address of packet 150, where the MSB is Nth bit of the IP network address of packet 150. As yet another example, processor 102 determines that packet 150 is an IPv4 packet 150 and extracts 3 MSBs of 8 MSBs of the IP network address of packet 150, where 2 bits other than the 3 MSBs and 3 LSBs of the IP network address are N bits of the IP network address of packet 150. As yet another example, processor 102 determines that packet 150 is an IPv6 packet 150 and extracts 4 LSBs from 16 MSBs of the IP network address of packet 150, where 12 MSBs are N bits of the IP network address of packet 150. An example of G includes bits other than N bits of 8 MSBs of the IP network address of packet 150. Another example of G includes 15 bits consecutively following an MSB of 16 MSBs of the IP network address of packet 150, where the MSB is $N^{th}$ bit of the IP network address of packet 150.

Processor 102 determines 206 whether packet 150 can be classified based on the G bits of packet 150. Processor 102 applies table V, shown below, stored in memory device 104 by the user to determine whether packet 150 can be classified based on the G bits of packet 150.

TABLE V

| SUB-RANGES | CLASSIFICATION VALUES | RESULTS |
|---|---|---|
| SR1-SR2 | C3 | S3 |
| SR3-SR4 | C4 | S4 |
| SR5-SR6 | | |
| SR7-SR8 | | |

The sub-ranges SR1-SR2, SR3-SR4, SR5-SR6, and SR7-SR8 within table V form a finite set, such as such as a set of G bits of port addresses, a set of G bits of authorization data, a set of G bits of IP network addresses, and a set of G bits of a combination of IP network addresses and port addresses.

Example of the classification values C3 and C4 include a set of country codes identifying a plurality of countries, a set of sub-region codes identifying a plurality of sub-regions, a set of hacker codes identifying a plurality of computer hackers, a set of spammer codes identifying a plurality of computer spammers, a set of virus codes identifying a plurality of computer viruses, a set of Trojan codes identifying a plurality of Trojans, a set of worm codes identifying a plurality of computer worms, a plurality of phishing codes identifying a plurality of phishers, a set of intruder codes identifying a plurality of intruders that gain access to a computer network connected to processor 102 via a backdoor, a set of NATO country codes identifying a plurality of NATO countries, a set of corporation codes identifying a plurality of corporations, a set of government agency codes identifying a plurality of government agencies, a set of ISP codes identifying a plurality of ISPs, a set of industrial sector codes identifying a plurality of industrial sectors, and a set of DoD codes identifying a plurality of DoDs. Examples of the results S3 and S4 include an acceptance or denial of packet 150 by processor 102. Other examples of the results S3 and S4 include assigning a priority or not assigning a priority to packet 150. It is noted that G is equal to H.

Upon determining that one of the sub-ranges SR1-SR2, SR3-SR4, SR5-SR6, and SR7-SR8 of table V has H bits that match G bits of packet 150, processor 102 assigns one of the corresponding classification values, such as C3 and C4, to packet 150. As an example, upon determining that G bits match H bits of the sub-ranges SR3-SR4, processor 102 assigns the classification value C4 to packet 150. If processor 102 determines that one of the classification values within table V exists corresponding to one of the sub-ranges, of table V, having H bits that match G bits of packet 150, processor 102 determines that packet 150 is classified. On the other hand, if processor 102 determines that one of the classification values within table V does not exist corresponding to one of the sub-ranges, within table V, having H bits that match G bits, processor 102 determines that packet 150 cannot be classified. For example, upon comparing, by processor 102, of G bits of packet 150 with the sub-ranges of table V, processor 102 determines that G bits match H bits within the sub-range SR5-SR6 that does not correspond to one of the classification values C3 and C4. In the example, upon determining by processor 102 that G bits of packet 150 do not correspond to one of the classification values C3 and C4, processor 102 determines that packet 150 cannot be classified.

Upon determining that packet 150 is classified, processor 102 either provides 208 a procedure or one of the results S3 and S4 corresponding to one of the classification values of table V or sends packet 150 to another processor 102, such as one included within workstation 54, that provides 208 one of the results S3 and S4 to packet 150. As an example, upon determining that packet 150 is classified as having the classification value C3, processor 102 applies the results S3 to packet 150. As another example, upon determining by processor 102 that packet 150 has the classification value C2, processor 102 sends packet 150 to another processor 102 that applies the result S2 to packet 150. Upon determining that packet 150 is classified, processor 102 does not extract bits of packet 150 other than the G and N bits to determine whether packet 150 can be classified.

A table VI, shown below, is an example of table V.

TABLE VI

| IP NETWORK ADDRESS SUB-RANGES | BITS THE IP NETWORK ADDRESS SUB-RANGES | RESULTS |
| --- | --- | --- |
| 128-160 | 00 | Deny |
| 161-207 | 01-10 | |
| 168-255 | 11 | Allow |

Bits of IP network address sub-ranges of table VI are an example of H bits of the sub-ranges of table V. For example, two, which is an example of H, bits 00 are second and third MSBs of 128 within IP network address sub-range 128-160 of table VI. As another example, bits 01 within table VI are second and third MSBs of 161 within IP network address sub-range 161-207 of table VI. Results of table VI are an example of results of table V.

Processor 102 receives G bits of packet 150, compares the G bits with H bits to determine whether packet 150 can be classified. For example, upon receiving G bits, processor 102 determines that G bits match 01 and determines that packet 150 cannot be classified and does not provide a result based on table VI. On the other hand, processor 102 receives G bits of packet 150, compares the G bits with bits 00 to determine that G bits are 00 and to deny passage of packet 150 through the firewall based on table VI. Moreover, processor 102 receives G bits of packet 150, compares the G bits with bits 11 within table VI to determine that the G bits are 11 and to determine to allow passage of packet 150 through the firewall as shown in table VI.

Upon determining that packet 150 cannot be classified based on the G and N bits of packet 150, processor 102 determines whether packet 150 can be classified by analyzing A bits of packet 150 other than the G and N bits. A table VII is shown below.

TABLE VII

| IP NETWORK ADDRESS SUB-RANGES | BITS THE IP NETWORK ADDRESS SUB-RANGES | RESULTS |
| --- | --- | --- |
| 192-207 | 0 | Deny |
| 208-223 | 1 | Allow |

Processor 102 receives A bits, such as the $5^{th}$ LSB of 8 MSBs of the IP network address of packet 150, compares the A bits with B bits, such as the $5^{th}$ LSB of 8 MSBs of the each IP network address with the IP network address sub-ranges of table VII, to determine whether packet 150 can be classified. For example, upon receiving A bits of packet 150, processor 102 determines that the A bits match 0, which is the $5^{th}$ LSB of 8MSBs of the IP network address sub-range 193 of an IP network address 193.0.0.0, determines that packet 150 can be classified, and denies passage of packet 150 via the firewall based on table VII. As another example, upon receiving A bits of packet 150, processor 102 determines that the A bits match bit 1, which is the $5^{th}$ LSB of 8 MSBs of the IP network address sub-range 210 of an IP network address 210.1.1.1, determines that packet 150 can be classified, and allows passage of packet 150 via the firewall based on table VII. It is noted that A is equal to B.

A table VIII, shown below, is an example of table V.

TABLE VIII

| IP NETWORK ADDRESS SUB-RANGES | BITS THE IP NETWORK ADDRESS SUB-RANGES | RESULTS |
|---|---|---|
| 160-168 | 0 | |
| 191 | 1 | Allow |

IP network address sub-ranges of table VIII is another example of the sub-ranges of table V. Bits of the IP network address sub-ranges of table VI are another example of H bits of the sub-ranges of table V. For example, bit 0 is the $5^{th}$ LSB of each of 8 MSBs 160-168 of a plurality of IP network addresses with MSBs ranging from and including 160 to 168, and 160-168 is an example of the sub-range SR5-SR6. As another example, bit 1 is the $5^{th}$ LSB of 8 MSBs 191 of a plurality of IP network addresses with MSB 191, and 191 is the IP network address sub-range SR1-SR2.

Processor 102 receives G bits of packet 150, compares the G bits with H bits of table VIII to determine whether packet 150 can be classified. For example, upon receiving G bits of packet 150, processor 102 determines that the G bits match 0 of IP network address sub-ranges 160-168 of table VIII, determines that the G bits cannot be classified, and does not provide a result to packet 150. As another example, upon receiving G bits of packet 150, processor 102 determines that the G bits match 1 of IP network address sub-range 191 to determine that packet 150 can be classified to allow packet 150 to pass through the firewall.

Upon determining that packet 150 cannot be classified based on comparing G bits of packet 150 with H bits, processor 102 determines whether packet 150 can be classified based on comparing A bits of packet 150 with B bits. A table IX is shown below.

TABLE IX

| IP NETWORK ADDRESS SUB-RANGES | BITS THE IP NETWORK ADDRESS SUB-RANGES | RESULTS |
|---|---|---|
| 160-167 | 0 | |
| 168 | 1 | Allow |

Processor 102 receives A bits of packet 150, compares the A bits with B bits, such as $4^{th}$ LSB of each of 8 MSBs 160-167 of a plurality of IP network addresses 160.0.0.0-167.255.255.255, to determine whether packet 150 can be classified. For example, upon receiving A bit of packet 150, processor 102 determines that the A bit matches bit 0, which is the $4^{th}$ LSB of each of 8 MSBs 160-167, determines that packet 150 cannot be classified and cannot be provided a result. As another example, upon receiving A bit of packet 150, processor 102 determines that the A bit match bit 1, which is the $4^{th}$ LSB of 8 MSBs 168 of a plurality of IP network addresses 168.0.0.0-168.255.255.255, determines that packet 150 can be classified, and allows passage of packet 150 through the firewall.

Upon determining that packet 150 cannot be classified based on the N, G, and A bits of packet 150, processor 102 obtains C bits of packet 150 and determines whether packet 150 can be classified based on the C bits. A table X is shown below.

TABLE X

| IP NETWORK ADDRESS SUB-RANGES | BITS THE IP NETWORK ADDRESS SUB-RANGES | RESULTS |
|---|---|---|
| 160-163 | 0 | |
| 164-167 | 1 | Deny |

As example of C bits of packet 150 includes $3^{rd}$ LSB of 8 MSBs of the IP network address of packet 150 that is an IPv4 packet 150. Another example of C bits of packet 150 includes $4^{th}$ LSB of the IP network address of packet 150 of packet 150 that is an IPv6 packet 150.

Processor 102 receives C bits of packet 150, compares the C bits with D bits, such as the $3^{rd}$ LSB of each of 8 MSBs of a plurality of IP network addresses 160.0.0.0-163.255.255.255, to determine whether packet 150 can be classified. For example, processor 102 compares C bits of packet 150 with bit 0, which is the $3^{rd}$ LSB of each of 8 MSBs 160-163 to determine that packet 150 cannot be classified and does not provide a result to packet 150. As another example, processor 102 compares C bit of packet 150 with bit 1, which is the $3^{rd}$ LSB of each of 8 MSBs 164-167 of a plurality of IP network addresses 164.0.0.0-167.255.255.255, to determine that packet 150 can be classified and to deny passage of packet 150 through the firewall. It is noted that C is equal to D.

Upon determining that packet 150 cannot be classified based on N, G, A, and C bits of packet 150, processor 102 obtains E bits of packet 150 and determines whether packet 150 can be classified based on the E bits. A table XI is shown below.

TABLE XI

| IP NETWORK ADDRESS SUB-RANGES | BITS THE IP NETWORK ADDRESS SUB-RANGES | RESULTS |
|---|---|---|
| 160-161 | 0 | |
| 163 | 1 | Allow |

An example of E bits of packet 150 includes the $2^{nd}$ LSB of 8 MSBs of the IP network address of packet 150 that is an IPv4 packet. Another example of E bits of packet 150 includes the $5^{th}$ LSB of 8 MSBs of IP network address of packet 150 that is an IPv6 packet.

Processor 102 receives E bits of packet 150, compares the E bits with F bits, such as the $2^{nd}$ LSB of each of IP network address sub-ranges of table XI, to determine whether packet 150 can be classified. For example, processor 102 compares E bits of packet 150 with bit 0, which is the $2^{nd}$ LSB of each of 8 MSBs 160-161 of a plurality of IP network addresses 160.0.0.0-161.255.255.255 to determine that packet 150 cannot be classified. As another example, processor 102 receives E bits of packet 150, compares the E bits with bit 1, which is the $2^{nd}$ LSB of 8 MSBs 163 of a plurality of IP network addresses 163.0.0.0-163.255.255.255 to determine that packet 150 can be classified and to allow passage of packet 150 through the firewall. It is noted that E is equal to F.

Upon determining that packet 150 cannot be classified based on N, G, A, C, and E bits of packet 150, processor 102 obtains I bits other than the N, G, A, C, and E bits of packet 150 to determine whether packet 150 can be classified based on the I bits. A table XII is shown below.

TABLE XII

| IP NETWORK ADDRESS SUB-RANGES | BITS THE IP NETWORK ADDRESS SUB-RANGES | RESULTS |
|---|---|---|
| 160 | 0 | Deny |
| 161 | 1 | Allow |

An example of I bits of packet 150 includes the LSB of 8 MSBs of the IP network address of packet 150 that is an IPv4 packet. Another example of I bits of packet 150 includes the LSB of 16 MSBs of the IP network address of packet 150 that is an IPv6 packet.

Processor 102 receives I bits of packet 150, compares the I bits with J bits, such as the LSB of each of IP network address sub-ranges of table XII, to determine whether packet 150 can be classified. For example, processor 102 compares I bit of packet 150 with bit 0, which is the LSB of 160 of a plurality of IP network addresses 160.0.0.0-160.255.255.255 to determine that packet 150 can be classified and to deny passage of packet 150 through the firewall. As another example, upon receiving I bit of packet 150, processor 102 compares the I bit with bit 1, which is the LSB of 161 of a plurality of IP network addresses 161.0.0.0-161.255.255.255, to determine that packet 150 can be classified and to allow passage of packet 150 through the firewall. Accordingly, processor 102 continues to compare additional bits of packet 150 with a plurality of tables, such as table V-XII, until packet 150 can be classified. It is noted that I is equal to J.

Figure 6:
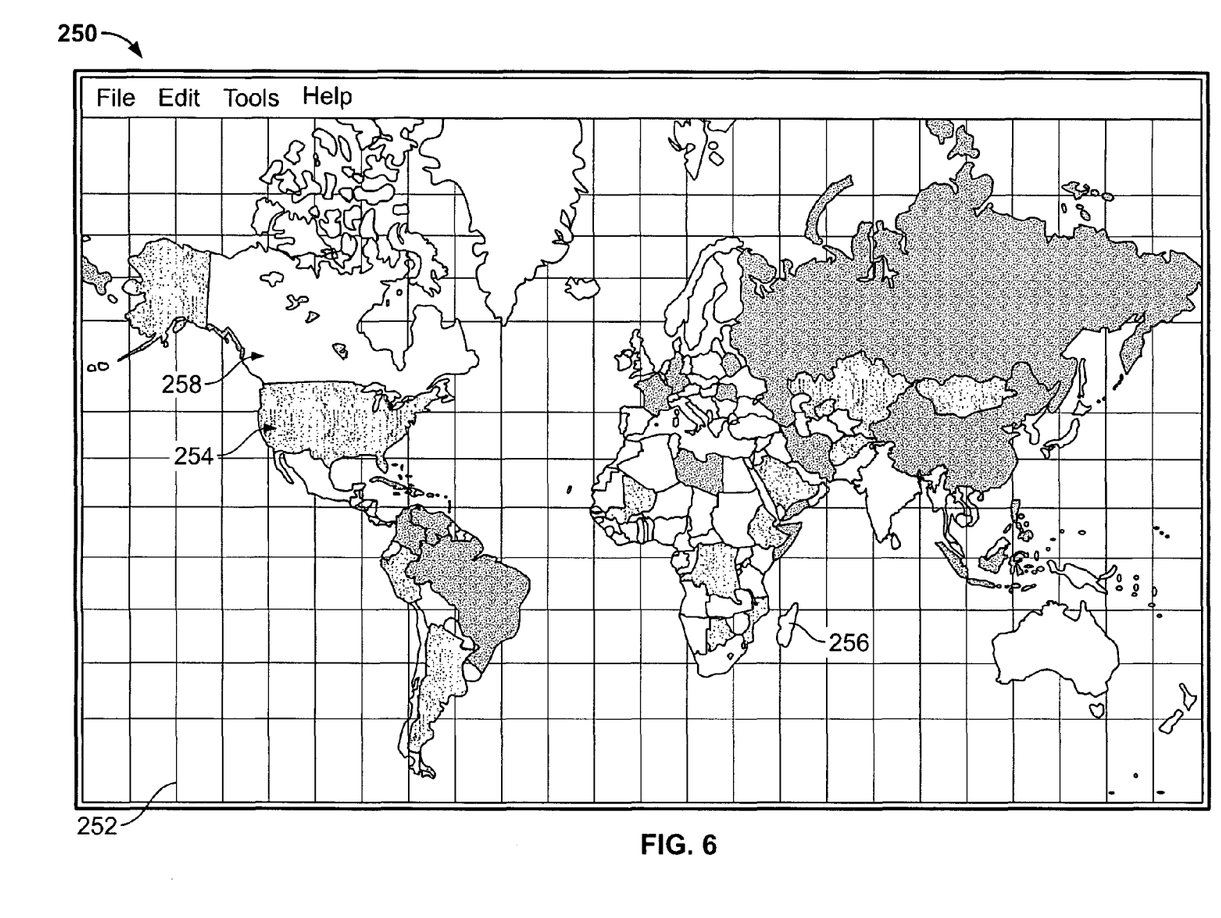
FIG. 6 is an embodiment of a graphical user interface (GUI) used to create a plurality of tables.

FIG. 6 is an embodiment of a graphical user interface (GUI) 250 used to create any of tables I-XII. Processor 102 displays, on output device 108, GUI 250 to the user. GUI 250 includes a map 252 of the world. Processor 102 associates or links a plurality of points 254, 256, and 258, on map 252, with one of the sub-ranges R1-R2, R3-R4, R5-R6, R7-R8, R9-R10, and R11-R12. For example, processor 102 associates point 254 with the sub-range R1-R2 of table I and associates point 256 the IP network address sub-range R5-R6 of table I. As another example, processor 102 associates point 254 with a port address of a port of a computer located within the U.S.A. and associates point 256 within a port address of a port of a computer located within Canada.

When the user selects, via input device 106, a point on map 252, processor 102 displays a plurality of results to the user. For example, when the user selects point 254, processor 102 displays a plurality of options including an allowance of packet 150, having N bits that match M bits of one of the sub-ranges R1-R2, R3-R4, R5-R6, R7-R8, R9-R10, and R11-R12 of an IP network address of a computer located at point 254, through the firewall, a denial of the packet 150, providing a priority to the packet 150, and not providing the priority to the packet 150. When the user selects one of the options, processor 102 associates the one of the options with a point on map 252. For example, when the user selects the allowance of packet 150, having N bits that match M bits of one of the sub-ranges R1-R2, R3-R4, R5-R6, R7-R8, R9-R10, and R11-R12, associated with point 254 through the firewall, processor 102 stores, within memory device 104, that packet 150, having N bits that match M bits of one of the sub-ranges R1-R2, R3-R4, R5-R6, R7-R8, R9-R10, and R11-R12, is to be allowed through the firewall. As another example, when the user selects providing a priority to packet 150, having N bits that match M bits of one of the sub-ranges R1-R2, R3-R4, R5-R6, R7-R8, R9-R10, and R11-R12, associated with point 258, processor 102 stores, in memory device 104, that packet 150 having the one of the sub-ranges is to be provided the priority.

In one embodiment, processor 102 associates a plurality of points within a region, such as a country, a city, a state, a corporation, and a computer network, on map 252 with one of the results S1 and S2 when the user selects once, such as by clicking a mouse once, any one of the points and selecting the one of the results. For example, when the user clicks for one time on point 254 within U.S.A. and selects allowance of packet 150, processor 102 associates all points within U.S.A. on map 252 with the allowance of packet 150 received from U.S.A. by processor 102. In the embodiment, processor 102 associates at least one point with a sub-region, such as a city, a government agency, an ISP, a corporation, a DoD, a computer, a port, located within the region with one of the results S1 and S2 when the user selects for a number, such as twice, of times, one of the at least one point and selects the one of the results. For example, when the user double clicks on point 254 representing a city within U.S.A. and selects no priority by double-clicking on point 254, processor 102 associates packet 150 received from the city to have no priority. As another example, when the user double clicks on point 258 representing a computer network within Canada and selects denial of passage of packet 150 by double clicking on point 258, processor 102 associates point 258 with the denial, through the firewall, of passage of packet 150 received from the computer network.

It is noted that in one embodiment, the methods of FIGS. 5 and 6, and tables I-XII are a finite state machine (FSM) implemented within a set of logic gates and shift registers to implement the firewall. In another embodiment, instead of assigning a priority, packet 150 is assigned a high priority and instead of assigning no priority, packet 150 is assigned a low priority lower than the high priority. It is noted that the methods illustrated by FIGS. 5 and 6, and tables I-XII are implemented in either a mini, micro, or mainframe hardware. In yet another embodiment, methods illustrated by FIGS. 5 and 6, and tables I-XII are implemented within a field programmable gate array (FPGA). The herein described systems and methods for determining a flow of data provides a tree-based traversal structure that allows an exponential execution of a plurality of rules or access control lists (ACLs). For example, processor 102 reaches a result by comparing 8 MSBs of IP address of packet 150 with either IP network address sub-range 3-4 of a plurality of IP addresses 3.0.0.0-4.255.255.255 in row 3 of table II or IP network address sub-range 5-9 of a plurality of IP addresses 5.0.0.0-9.255.255.255 in row 4 of table II as opposed to comparing all bits of packet 150 with the IP addresses 3.0.0.0-4.255.255.255 and 5.0.0.0-9.255.255.255. As another example, processor 102 provides a result exponentially faster than that provided by comparing all bits of packet 150 with a set of bits. In the example, processor 102 provides a result exponentially faster by comparing $2^{nd}$ and $3^{rd}$ MSBs of 8 MSBs of IP address of packet 150 with $2^{nd}$ and $3^{rd}$ MSBs of 8 MSBs 128-160, within table VI, of IP addresses 128.0.0.0-160.255.255.255. The methods and systems for determining a flow of data described herein does not need to execute a floating point operation and therefore can run within a kernel space.

Systems and methods described herein achieve an isolation between two networks connected via the firewall by denying packet 150 from a region, such as a country, or alternatively from the sub-region. Moreover, systems and methods described herein allow passage of packet 150 through the firewall upon determining that packet 150 is received from an ally of a country in which the firewall is located. Additionally, the systems and methods described herein are used to deny packet 150 received from an entity other than a plurality of organizations within a group.

Systems and methods described herein are executed by reducing incidences of unsolicited emails or spam to improve Internet throughput. For example, processor 102 determines based on N bits of packet 150 and table II whether packet 150 is classified within a country code 66 of Germany. Upon determining that packet 150 has a classification value of 66, processor 102 determines to deny packet 150 that may include spam from Germany and increases throughput of Internet by reducing passage of spam through the firewall to a network. As another example, processor 102 determines based on N bits of packet 150 that packet 150 is assigned a country code other than 189. Upon determining that packet 150 is assigned a country code other than 189, processor 102 denies passage of packet 150 through the firewall and the denial reduces reception, by a network coupled to the firewall, of spam from countries other than U.S.A. Moreover, in the example, by reducing to reception of spam from U.S.A., processor 102 makes it significantly easier to track spammers within U.S.A. In the example, processor 102 applies the methods for determining a flow of data to process packet 150, sent from U.S.A., significantly, such as ten times, faster than a communication speed of 9.6 Gigabits per second (Gbps) of an optical carrier-192 (OC-192). The methods described herein are used to mitigate a wide variety of computer communication network security threats, such as, computer viruses sent by attackers. The methods provide scalability, adaptability, and performance characteristics used to adapt to an every-evolving scope of security problems. The methods described herein can be implemented within numerous security products, such as data shunt devices, network simulation systems, biometric analysis systems, biometric anomaly analysis systems, security architecture design systems, network operation centers, virtual private networks (VPNs), and security information management systems.

While the invention has been described in terms of various specific embodiments, those skilled in the art will recognize that the invention can be practiced with modification within the spirit and scope of the claims.

What is claimed is:

1. A method for determining a flow of data, the method comprising:
   a. receiving a data packet;
   b. providing a memory device containing one or more tables, each one or more table being populated with a finite number of listed bit sets, each listed bit set having an equal number of bits as a set of bits previously designated for extraction from the packet and each listed bit set in the one or more tables being associated with either a predetermined classification value assignable to the packet or a designation that the packet cannot be classified;
   the set of bits previously designated for extraction from the packet being: (1) one set among a plurality of sets of bits designated for extraction from the packet; and (2) comprising one or more bits, none of which bits are included in any other set of bits designated for extraction from the packet;
   c. extracting from the packet a first set of bits designated for extraction;
   d. inputting the extracted first set of bits designated for extraction into the memory device and comparing the extracted first set of bits with the finite number of listed bit sets in a table to determine whether the extracted first set of bits matches a listed bit set in the table;
   e. determining whether the packet receives a predetermined classification value or a designation that the packet cannot be classified based upon which listed bit set in the table the extracted first set of bits matches;
   f. applying a predetermined result or procedure to the packet upon determining that the packet can be assigned a classification value from the table; and
   g. upon determining the packet cannot be classified, continuing to sequentially process the remaining sets of bits designated for extraction by repeating procedures c-f until such point that an extracted set of bits matches a bit set listed in a table that has an assigned classification value or all sets of bits in the packet designated for extraction have been extracted and compared to the entries of at least one table.

2. A method in accordance with claim 1 wherein a set of bits designated for extraction includes less than 32 bits of the IP network address of an IPv4 packet.

3. A method in accordance with claim 1 wherein a set of bits designated for extraction includes less than 128 bits of the IP network address of an IPv6 packet.

4. A method in accordance with claim 1 wherein a set of bits designated for extraction includes one or more bits other than those previously determined to be the most significant bits of the IP network address.

5. A method in accordance with claim 1 wherein a set of bits designated for extraction includes one or more bits other than those previously determined to be among the least significant bits of the IP network address.

6. A method in accordance with claim 1 wherein a set of bits designated for extraction includes one or more bits previously determined to be among the most significant bits of the IP network address.

7. A method in accordance with claim 1 wherein an extracted set of bits is extracted from the IP network address, the port address or the data of the packet.

8. A method in accordance with claim 1 wherein a portion of an extracted set of bits is extracted in part from the IP network address and the remainder of the first set of bits is extracted from the port address.

9. A method in accordance with claim 1 wherein each bit set listed in a table against which a set of bits is compared constitutes an IP network address sub-range.

10. A method in accordance with claim 1 wherein one or more of the classification values assigned to a bit set listed in a table against which a set of bits is compared constitute country codes.

11. A method in accordance with claim 1, wherein the classification value comprises one of a code identifying a country, a code identifying a sub-region, a code identifying a computer hacker, a code identifying a computer spammer, a code identifying a computer virus, a code identifying a Trojan, a code identifying a computer worm, a code identifying a phisher, a code identifying an intruder, a code identifying a North Atlantic treaty organization country, a code identifying a corporation, a code identifying a government agency, a code identifying an Internet service provider, a code identifying an industrial sector, and a code identifying a Department of Defense.

12. A system for analyzing a data packet, the system comprising:
   a memory device containing one or more tables, each one or more table being populated with a finite number of listed bit sets, each listed bit set having an equal number of bits as a set of bits previously designated for extraction from the packet and each listed bit set in the one or more tables being associated with either a predetermined classification value assignable to the packet or a designation that the packet cannot be classified;

the set of bits previously designated for extraction from the packet being: (1) one set among a plurality of sets of bits designated for extraction from the packet; and (2) comprising one or more bits, none of which bits are included in any other set of bits designated for extraction from the packet;

a processor configured to:
  a. receive the data packet;
  b. extract from the packet a first set of bits designated for extraction;
  c. input the extracted first set of bits designated for extraction into the memory device and compare the extracted first set of bits with the finite number of listed bit sets in a table to determine whether the extracted first set of bits matches a listed bit set in the table;
  d. determine whether the packet receives a predetermined classification value or a designation that the packet cannot be classified based upon which listed bit set in the table the extracted first set of bits matches;
  e. apply a predetermined result or procedure to the packet upon determining that the packet can be assigned a classification value from the table; and
  f. upon determining the packet cannot be classified, continue to sequentially process the remaining sets of bits designated for extraction by repeating procedures b-e until such point that an extracted set of bits matches a bit set listed in a table that has an assigned classification value or all sets of bits in the packet designated for extraction have been extracted and compared to the entries of at least one table.

* * * * *